United States Patent
Shimada

(10) Patent No.: US 8,565,582 B2
(45) Date of Patent: Oct. 22, 2013

(54) IMAGE REPRODUCING DEVICE, IMAGE RECORDING/REPRODUCING DEVICE, IMAGE REPRODUCING METHOD, AND IMAGE RECORDING/REPRODUCING METHOD

(75) Inventor: Masaaki Shimada, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 886 days.

(21) Appl. No.: 12/674,592

(22) PCT Filed: Aug. 6, 2008

(86) PCT No.: PCT/JP2008/064152
§ 371 (c)(1), (2), (4) Date: Feb. 22, 2010

(87) PCT Pub. No.: WO2009/028312
PCT Pub. Date: Mar. 5, 2009

(65) Prior Publication Data
US 2011/0261045 A1 Oct. 27, 2011

(30) Foreign Application Priority Data
Aug. 31, 2007 (JP) .................................. 2007-225470

(51) Int. Cl.
*H04N 9/80* (2006.01)
*H04N 5/775* (2006.01)
*H04N 5/77* (2006.01)

(52) U.S. Cl.
USPC ........... 386/248; 386/231; 386/234; 386/228; 386/222; 386/230

(58) Field of Classification Search
USPC ..................... 386/248, 230, 231, 234, 228
See application file for complete search history.

(56) References Cited

U.S. PATENT DOCUMENTS

| 5,375,230 | A | * | 12/1994 | Fujimori | 713/323 |
| 5,623,533 | A | * | 4/1997 | Kikuchi et al. | 455/572 |
| 7,827,319 | B2 | * | 11/2010 | Kimura et al. | 710/5 |
| 8,189,989 | B2 | * | 5/2012 | Shimada | 386/219 |

(Continued)

FOREIGN PATENT DOCUMENTS

| JP | 2001-229609 A | 8/2001 |
| JP | 2007-042191 A | 2/2007 |

(Continued)

OTHER PUBLICATIONS

Instruction Manual: Panasonic DVD recorder "DMR-XW31," Matsushita Electric Industrial Co., Ltd., p. 112 "HDMI Connection".

*Primary Examiner* — Helen Shibru
(74) *Attorney, Agent, or Firm* — Birch, Stewart, Kolasch & Birch, LLP

(57) ABSTRACT

An objective of the present invention is to provide an image reproducing device in which energy saving characteristics and responsiveness are balanced. An image reproducing device according to this invention includes an operation-state-information acquisition unit for obtaining operation-state information of a display device for displaying the reproduced image signal, an operation input unit for inputting an operation command to operate the image reproducing device, and a mode setting unit for setting a mode for supplying electric power to the image reproducing device according to the operation-state information.

12 Claims, 9 Drawing Sheets

(56) References Cited

U.S. PATENT DOCUMENTS

| | | | |
|---|---|---|---|
| 8,210,948 B2* | 7/2012 | Shimada et al. | 463/43 |
| 8,347,128 B2* | 1/2013 | Suzuki et al. | 713/310 |
| 2002/0008775 A1* | 1/2002 | Kweon | 348/460 |
| 2003/0055946 A1* | 3/2003 | Amemiya | 709/224 |
| 2006/0197918 A1* | 9/2006 | Kobayashi | 353/57 |
| 2007/0287495 A1* | 12/2007 | Takuma | 455/550.1 |
| 2007/0296832 A1* | 12/2007 | Ota et al. | 348/231.99 |
| 2009/0041438 A1 | 2/2009 | Kuno | |
| 2009/0279874 A1* | 11/2009 | Okada et al. | 386/126 |

FOREIGN PATENT DOCUMENTS

| | | |
|---|---|---|
| JP | 2007-214651 A | 8/2007 |
| JP | 2007-259647 A | 10/2007 |
| JP | 2008-022115 A | 1/2008 |
| WO | WO-2006/109581 A1 | 10/2006 |

* cited by examiner

FIG. 2

| | Time | Silence | Mon.(2007/08/13) DOS | TW | Point 1WB | 2WB | ... | Sat.(2007/08/11) DOS | TW | Point 1WB | 2WB | Sun.(2007/08/12) DOS | TW | Point 1WB | 2WB |
|---|---|---|---|---|---|---|---|---|---|---|---|---|---|---|---|
| T01 | 0-2 | ○ | — | 0 | 0 | 0 | ... | — | 30 | 0 | 0 | — | 0 | 0 | 0 |
| T02 | 2-4 | ○ | — | 0 | 0 | 0 | ... | — | 0 | 0 | 0 | — | 0 | 0 | 0 |
| T03 | 4-6 | ○ | — | 0 | 0 | 0 | ... | — | 0 | 0 | 0 | — | 0 | 0 | 0 |
| T04 | 6-8 | ○ | View (103ch) | 60 | 45 | 15 | ... | — | 0 | 0 | 0 | View (015ch) | 60 | 0 | 45 |
| T05 | 8-10 | × | View (103ch) | 30 | 40 | 60 | ... | View (101ch) | 120 | 0 | 0 | — | 0 | 0 | 0 |
| T06 | 10-12 | × | — | 0 | 0 | 0 | ... | View (021ch) | 120 | 45 | 60 | — | 0 | 0 | 0 |
| T07 | 12-14 | × | — | 0 | 0 | 0 | ... | — | 0 | 0 | 0 | — | 0 | 0 | 0 |
| T08 | 14-16 | × | — | 0 | 60 | 15 | ... | — | 0 | 0 | 0 | — | 0 | 0 | 0 |
| T09 | 16-18 | × | Play (DVD) | 90 | 15 | 60 | ... | Play (DVD) | 120 | 0 | 0 | View (011ch) | 90 | 15 | 60 |
| T10 | 18-20 | × | Play (DVD) | 120 | 30 | 0 | ... | View (041ch) | 120 | 120 | 0 | View (041ch) | 120 | 120 | 0 |
| T11 | 20-22 | ○ | Play (DVD) | 60 | 100 | 120 | ... | View (041ch) | 45 | 30 | 45 | View (041ch) | 120 | 45 | 45 |
| T12 | 22-24 | ○ | — | 0 | 0 | 45 | ... | View (031ch) | 45 | 15 | 60 | View (031ch) | 60 | 0 | 0 |

Latest Update Date-Time : 2007/08/13 00:09:30

DOS : Device Operation State
TW : This Week , 1WB : 1 Week Before , 2WB : 2 Weeks Before

FIG. 4
| Time | | | Mon.(2007/08/13) | | | |
|---|---|---|---|---|---|---|
| | | Silence | DOS | Point | | |
| | | | | TW | 1WB | 2WB |
| T04 | 6-8 | O | View (103ch) | 60 | 45 | 15 |
Weighting factor
401 — X = 1.00
402 — Y = 0.50
403 — Z = 0.25
410
Device-usage probability = Point 221 × X + Point 222 × Y + Point 223 × Z
= 60 × 1.00 + 45 × 0.50 + 15 × 0.25 = 86.25

FIG. 7

| Time | | Silence | Mon.(2007/08/13) | | | | ... | Sat.(2007/08/11) | | | | San.(2007/08/12) | | | |
|---|---|---|---|---|---|---|---|---|---|---|---|---|---|---|---|
| | | | DOS | TW | Point 1WB | 2WB | | DOS | TW | Point 1WB | 2WB | DOS | TW | Point 1WB | 2WB |
| T01 | 0-2 | ○ | — | 0 | 0 | 0 | | — | 30 | 0 | 0 | — | 0 | 0 | 0 |
| T02 | 2-4 | ○ | — | 0 | 0 | 0 | | — | 0 | 0 | 0 | — | 0 | 0 | 0 |
| T03 | 4-6 | ○ | — | 0 | 0 | 0 | | — | 0 | 0 | 0 | — | 0 | 0 | 0 |
| T04 | 6-8 | ○ | View (103ch) | 60 | 0 | 15 | | — | 0 | 0 | 0 | View (015ch) | 60 | 0 | 45 |
| T05 | 8-10 | × | Rec (HD) | 30 | 45 | 60 | | View (101ch) | 120 | 0 | 60 | — | 0 | 0 | 0 |
| T06 | 10-12 | × | — | 0 | 40 | 0 | | View (021ch) | 120 | 45 | 0 | — | 0 | 0 | 0 |
| T07 | 12-14 | × | — | 0 | 0 | 60 | | — | 0 | 0 | 0 | — | 0 | 0 | 0 |
| T08 | 14-16 | × | — | 0 | 15 | 0 | | — | 0 | 0 | 0 | — | 0 | 15 | 0 |
| T09 | 16-18 | × | Play (HD) | 90 | 30 | 15 | | Play (HD) | 120 | 120 | 0 | View (011ch) | 90 | 120 | 60 |
| T10 | 18-20 | × | Play (HD) | 120 | 120 | 120 | | View (041ch) | 120 | 30 | 45 | View (041ch) | 120 | 45 | 0 |
| T11 | 20-22 | ○ | Play (HD) | 60 | 100 | 45 | | View (031ch) | 45 | 15 | 60 | View (031ch) | 60 | 0 | 0 |
| T12 | 22-24 | ○ | — | 0 | 0 | 0 | | | | | | | | | |

Latest Update Date-Time: 2007/08/13 00:08:00

DOS : Device Operation State
TW : This Week , 1WB : 1 Week Before , 2WB : 2 Weeks Before

IMAGE REPRODUCING DEVICE, IMAGE RECORDING/REPRODUCING DEVICE, IMAGE REPRODUCING METHOD, AND IMAGE RECORDING/REPRODUCING METHOD

TECHNICAL FIELD

The present invention relates to an image reproducing device for reproducing an image signal recorded on an information recording medium such as an optical disk and a hard disk, and an image recording/reproducing device for recording and reproducing the image signal, and especially to an image reproducing device, an image recording/reproducing device, an image reproducing method, and an image recording/reproducing method, in which a control technology related to energy saving is utilized.

BACKGROUND ART

An optical disk player and an optical disk recorder or a hard disk recorder are well known as an image reproducing device reproducing an image signal that includes video/audio information coded and recorded on an optical disk or a hard disk, etc. which are information recording media, and as an image recording/reproducing device by which an image signal that includes coded video/audio information can be recorded and reproduced.

Generally, in the image reproducing device and the image recording/reproducing device whose information recording media are disks, a considerably long time period is required before a reproducing or recording operation starts from an electric-power-off state. The reason is that such image reproducing device and image recording/reproducing device are configured with many devices; therefore, when the operation is started by switching from the power-off state to the power-on state, until all of the devices reach the normal-operation state, neither the reproducing nor the recording can be performed. Therefore, the time required for reaching the state in which the reproducing or the recording can be performed after switching to the power-on state is rate-controlled by the rise time of a device whose rise time is longest among those of all devices.

Especially, in the image reproducing device and the image recording/reproducing device in which a disk such as an optical disk and a hard disk is used as an information recording medium, a considerably long time period is required before the rotation speed of the disk rises up to a predetermined level at which normal recording and reproducing can be performed; therefore, a problem occurs that a user has to wait a considerably long time period after switching the device to the power-on state.

Accordingly, in order to shorten the waiting time for the user, by continuously supplying electric power to the image reproducing device and the image recording/reproducing device so as to continuously rotate the disk, the responsiveness is improved and the user's convenience is increased.

A recent image reproducing device and image recording/reproducing device have a function for cooperating with a display device such as a television set connected thereto for displaying a reproduced coded image. For example, an image recording/reproducing device is known that can be automatically set to the power-on state in conjunction with the power-on state of the display device (For example, Instruction Manual: Panasonic DVD recorder "DMR-XW31", Matsushita Electric Industrial Co., Ltd., p 112, "HDMI Connection").

Regarding the image recording/reproducing device, by utilizing HDMI-CEC (high-definition multimedia interface-consumer electronics control), the image recording/reproducing device can be powered on in conjunction with the power-on operation of the display device. Therefore, during a period in which the user watches the display device connected via HDMI to the image recording/reproducing device, even if the image that the user watches is not what is reproduced from the image recording/reproducing device, but what is from another source such as a digital broadcast tuner, because the image recording/reproducing device has been set to be the power-on state, the user can instantaneously reproduce image signals recorded on the disk of the image recording/reproducing device, to watch without being kept waiting for a long time.

SUMMARY OF THE INVENTION

However, in the conventional image recording/reproducing device as above, electric power is needed to be supplied in conjunction with the power-on operation of the display device, to all of devices constituting the image recording/reproducing device; therefore, a problem has been that electric power is uselessly consumed in the image recording/reproducing device even during a time period in which the user watches another source image using only the display device. That is, the responsiveness to user's operations is favorable; however, a problem has been in the energy saving aspects.

An objective of the present invention, which is made to solve the above described problem, is to provide an image reproducing device or an image recording/reproducing device by which both of energy saving aspects and responsiveness are balanced when an image signal recorded on an information recording medium is reproduced.

An image reproducing device, according to the present invention, which reproduces an image signal recorded on a recording medium and connects to a display device for displaying the reproduced image signal, includes an operation-state-information acquisition unit for obtaining operation-state information of the display device, an operation input unit for inputting an operation command to operate the image reproducing device, an operation-time-information acquisition unit for obtaining information on an operation time during which the image reproducing device has been operated in accordance with the operation command, a point giving unit for giving, on the basis of the operation-time information, a point for each of predetermined time slots, a storage unit for storing as operation-history information the point given for each of the predetermined time slots, and a mode setting unit for setting, on the basis of the operation-history information and the operation-state information, a mode for supplying electric power to the image reproducing device.

According to the present invention, because the electric-power supplying mode for supplying to the image reproducing device is made to be set on the basis of the operation-history information of the image reproducing device and the operation-state information of the display device, in a normal time slot, energy saving characteristics can be secured, and in a time slot in which the probability that the user uses the image reproducing device is relatively high, responsiveness of the device can also be secured; therefore, the image reproducing device can be obtained in which both of the energy saving characteristics and the responsiveness to user's operations are balanced.

BRIEF DESCRIPTION OF DRAWINGS

FIG. 2 illustrates a specific example of an operation-history-information data structure of the image reproducing device according to Embodiment 1 of the present invention;

FIG. 4 is an explanatory diagram representing a method of calculating a device-usage probability on the basis of operation-history points explained in Embodiment 1 of the present invention;

FIG. 7 illustrates a specific example of an operation-history-information data structure of the image recording/reproducing device according to Embodiment 2 of the present invention;

DETAILED DESCRIPTION OF THE PREFERRED EMBODIMENT

In an image reproducing device for reproducing an image signal that is video/audio information coded and recorded on an information recording medium such as an optical disk, or an image recording/reproducing device also having a function for recording into an information recording medium an image signal that is video/audio information obtained, for example, from a digital broadcast, a configuration thereof is considered to be provided with a plurality of electric power supplying modes referred to as a "normal mode", "standby mode" and "energy saving mode" as means for improving energy saving performance.

Here, the "normal mode" means a normal operation mode in which electric power is supplied to all of devices constituting the image reproducing device or the image recording/reproducing device, and the disk is also rotationally driven in a predetermined rotation speed; therefore, in this mode, the device is ready to immediately respond, but the largest amount of electric power is consumed. Next, the "standby mode" generally means a mode where electric power is supplied so that the device is able to stand by in a state in which a user can operate by remote control or the like, and electric power is not supplied to devices except for those that process user operations; therefore, a state can be achieved where the most energy saving effect can be expected. The "energy saving mode" means a mode where electric power is supplied, in addition to the devices that process the user operations, to only devices that require substantial time for starting up in the image reproducing device or the image recording/reproducing device; therefore, while relatively favorable responsiveness to the user operations can be secured, relatively favorable energy saving effect can also be achieved although it is not as much as that in the standby mode.

In the following descriptions, embodiments according to the present invention are explained, in which, with respect to the image reproducing device according to the embodiments of the present invention, an optical disk is used as an example of the information recording medium, and, with respect to the image recording/reproducing device according to the embodiments of the present invention, a hard disk is used as an example of the information recording medium.

Embodiment 1

Figure 1:
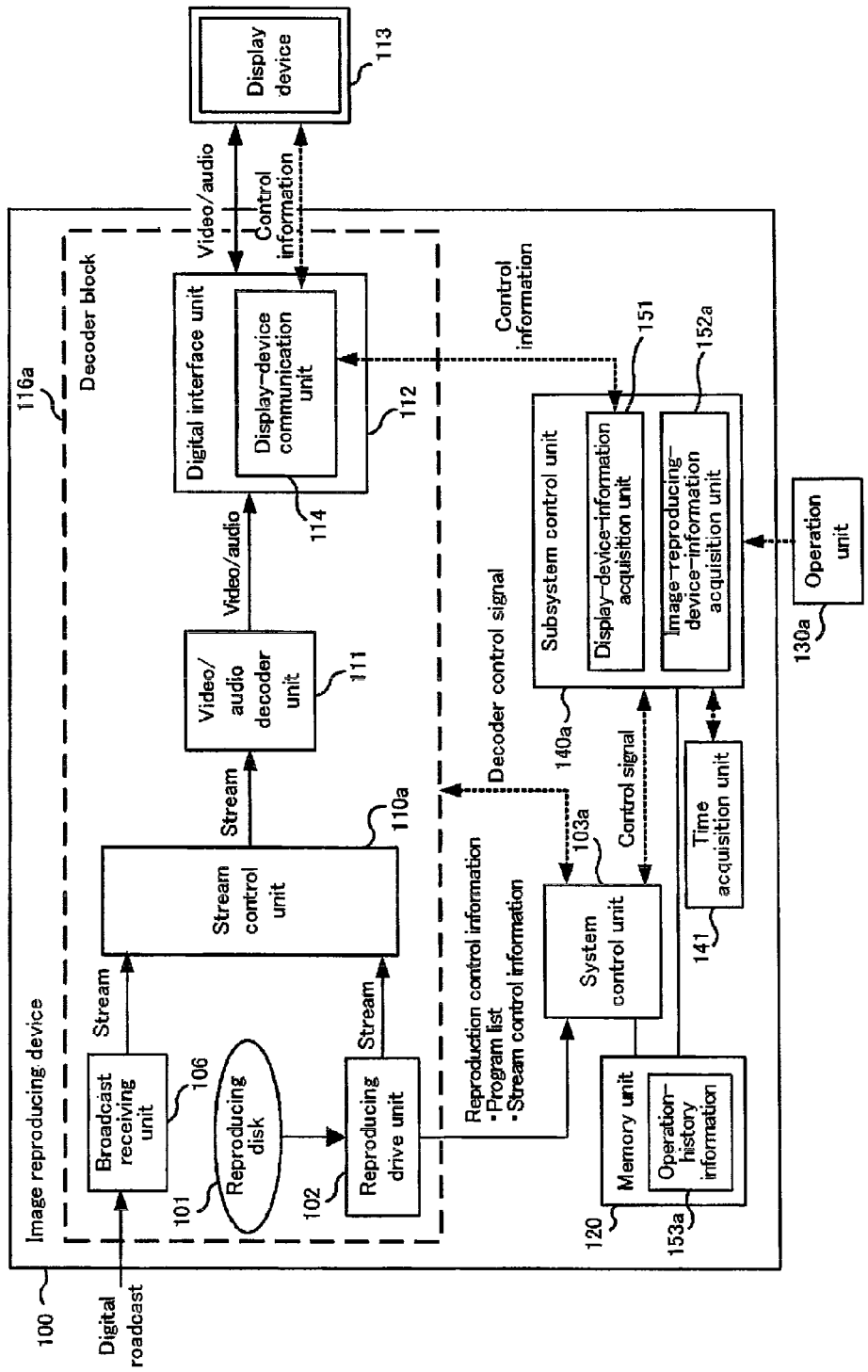
FIG. 1 is a configuration diagram illustrating an example configuration of an image reproducing device according to Embodiment 1 of the present invention.

FIG. 1 is a configuration view illustrating an example configuration of an image reproducing device according to Embodiment 1 of the present invention. This image reproducing device 100 is configured to be able to be connected to a display device 113 such as an LCD panel and a CRT monitor that can display images. The image reproducing device 100 is also provided with a plurality of electric-power supplying modes referred to as the "normal mode", the "standby mode", and the "energy saving mode", as described above.

In FIG. 1, an image signal that is video/audio information coded and recorded on a reproducing disk 101 such as an optical disk is reproduced by a reproducing drive unit 102. The reproduced image signal includes stream information in which coded images are multiplexed and reproduction control information for the stream information. This reproduction control information keeps, for example, a program list that is video/audio attribute information with respect to coded video/audio stream separated from the stream information, and stream control information representing a correspondence relationship between reproduction start-time information and reproduction start-position information in a GOP (group of picture) unit that is an access unit for the stream information.

Here, in Embodiment 1, a case is explained as an example in which the information recording medium is an optical disk; however, the medium is not limited to the optical disk, but, for example, a removable hard disk, a memory card using a non-volatile semiconductor memory, or a USB (universal serial bus) memory may also be used. In such cases, the stream information and the reproduction control information are recorded on the hard disk or the memory card, etc., and, the recorded information is read out through the reproducing drive unit 102 corresponding to each of the information recording media.

Next, the stream information outputted from the reproducing drive unit 102 is inputted into a stream control unit 110a. Meanwhile, the reproduction control information outputted from the reproducing drive unit 102 is inputted into a system control unit 103a.

In addition, the image reproducing device 100 can receive digital broadcasting. A digital broadcast wave that has been previously coded and compressed by MPEG-2 TS (moving picture experts group-2 transport stream) can be received by a broadcast receiving unit 106. In the digital broadcast wave, video/audio signals of a plurality of broadcast programs may be multiplexed. In such cases, the broadcast receiving unit 106 extracts only MPEG-2 TS of a specific program from the digital broadcast wave. The stream information of MPEG-2 TS extracted by the broadcast receiving unit 106 is inputted into the stream control unit 110a. Here, flow of the stream information in the image reproducing device 100 is controlled overall by the stream control unit 110a.

The stream information outputted from the stream control unit 110a is inputted into a video/audio decoder unit 111, and then decoded into a video signal and an audio signal. The decoded video signal and audio signal are inputted into a digital interface unit 112. Here, the image reproducing device 100 and the display device 113 are connected to each other through the digital interface unit 112 provided in the image reproducing unit 100.

The digital interface unit 112 converts the video signal and the audio signal inputted from the video/audio decoder unit 111 into signals adapted to HMG. The converted video signal and audio signal are transmitted to the display device 113, and provided for user watching.

Here, a display-device communication unit 114 provided inside the digital interface unit 112 is configured to be able to communicate control information with the display device 113, and can obtain, on the basis of the control information, operation states (an electric-power on/off state and a display-screen content), etc. of the display device 113. For example, as a communication protocol that the display-device communication unit 114 uses, a standard, for device control, referred to as CEC that is a function of HDMI is used. Here, in Embodiment 1 according to the present invention, although an example is explained in the case of using HDMI, as communication means that the display-device communication unit 114 uses, any means may be used as long as it can obtain the operation states of the display device 113, and needless to say, for example, a communication mechanism, such as communication using an IEEE1394 terminal, or infrared-ray communication, may be used to obtain the states. In Embodiment 1 according to the present invention, the display-device communication unit 114 is provided inside the digital interface unit 112; however, the unit is not necessary to be provided in the digital interface unit 112.

A block including the reproducing drive unit 102, the broadcast receiving unit 106, the stream control unit 110*a*, the video/audio decoder unit 111, and the digital interface unit 112 having the display-device communication unit 114 thereinside is hereinafter referred to as a decoder block 116*a*.

In the decoder block 116*a*, stream information is reproduced on the basis of a decoder control signal from the system control unit 103*a*.

The system control unit 103*a* receives the reproduction control information outputted from the reproducing drive unit 102 and stores the information in a memory unit 120. The system control unit 103*a* can instantaneously read out reproduction control information, related to stream information to be reproduced, stored in the memory unit 120.

When a user makes a request related to an operation to the image reproducing device 100, the user operates an operation unit 130*a*. Generally, the operation unit 130*a* means an operation panel arranged on the front panel of the image reproducing device 100, or a provided remote controller, etc. The user's request from the operation unit 130*a* is once inputted in a subsystem control unit 140*a*, and then the content of the request is interpreted. A main function of the subsystem control unit 140*a* is to perform a system-start/stop processing of the image reproducing device 100.

Generally, when the electric-power supplying mode is the standby mode, in the image reproducing device 100, electric power is continuously supplied only to the subsystem control unit 140*a*, a time acquisition unit 141 described later, and the memory unit 120; therefore, the image reproducing device 100 itself needs little power. When a start operation is requested from the user, the subsystem control unit 140*a* supplies electric power to devices such as the system control unit 103*a* and the decoder block 116*a*, and performs the start processing. Then, the subsystem control unit 140*a* transmits to the system control unit 103*a* the content of the user request inputted from the operation unit 130*a*; thus, the start processing is finished.

A display-device-information acquisition unit 151 provided inside the subsystem control unit 140*a* obtains the operation state of the display device 113 connected to the image reproducing device 100 on the basis of the control information of the display device outputted from the display device 113 and inputted into the display-device communication unit 114. The display-device-information acquisition unit 151 can obtain through the display-device communication unit 114 information whether electric power is supplied to the display device 113 (information that indicates whether the display device 113 is in a power-on state), output screen information (information whether the user is watching the screen, or whether external input mode is displayed thereon, etc.) of the display device 113, watching channel information, information with respect to an output sound level, etc. of the display device 113. The information can be obtained even when the electric-power supplying mode is the standby mode.

An image-reproducing-device-information acquisition unit 152*a* provided inside the subsystem control unit 140*a* obtains a device-operation track record (user's device-usage track record) of the image reproducing device 100. The device-operation track record is a list in which used hours for each predetermined time period segmented for each day of the week are numerically represented, which is device-operation-time information (user's using-time information) in a previous predetermined period. Specifically, information representing a time at which electric power is supplied to the image reproducing device 100 and that at which the power supplying is stopped, and reproducing-device-operation states (for example, reproducing an optical disk, or watching digital broadcasting, etc.) that have been used most during the respective predetermined time periods are obtained. On the basis of the obtained information, the device-operation track record is created.

The device-operation track record is stored as operation-history information 153*a* in the memory unit 120 that is the non-volatile memory. In this embodiment, the following explanation is carried out assuming that the operation-history information 153*a* can be accessed by both of the system control unit 103*a* and the subsystem control unit 140*a*; however, the information may be stored in each of individual memories which the respective units can access, or may exist as information which only the subsystem control unit 140*a* can access.

Here, the example is represented in this embodiment in which the display-device-information acquisition unit 151 and the image-reproducing-device-information acquisition unit 152*a* are implemented by firmware, etc. in the subsystem control unit 140*a*; however, needless to say, they may be provided outside the subsystem control unit 140*a*, or they may be hardware having those functions.

Next, using FIG. 1, flows, in the image reproducing device 100, of the stream information outputted from the broadcast receiving unit 106 after the unit has received digital broadcast signals, and of the stream information included in image signals reproduced by the reproducing drive unit 102 will be explained.

In FIG. 1, when the user inputs from the operation unit 130*a* a request for watching digital broadcast program on the display device 113 connected to the image reproducing device 100, an operation command that is the user's request inputted from the operation unit 130*a* is transmitted, after its content is interpreted by the subsystem control unit 140*a*, as a control signal corresponding to the operation command, to the system control unit 103*a*. The system control unit 103*a* transmits to the decoder block 116*a* a decoder control signal corresponding to the operation command; thereby, the broadcast receiving unit 106 provided in the decoder block 116*a* receives channel program that the user desires to watch.

Next, stream information of a received specific program that the user desires to watch is inputted into the stream control unit 110*a*, and then transmitted to the video/audio decoder unit 111 and decoded there; thus, video signals and audio signals corresponding to the program are outputted from the video/audio decoder unit 111. The video signals and the audio signals are transmitted to the display device 113 through the digital interface unit 112; thereby, the user can watch the program using the display device 113.

On the other hand, when the user inputs a request for watching from the operation unit 130*a* on the display device 113 connected to the image reproducing device 100, video/audio information recorded on the reproducing disk 101 that is the optical disk, an operation command that is the user's request inputted from the operation unit 130*a* is transmitted as a control signal corresponding to the operation command to the system control unit 103*a*, after its content is interpreted by the subsystem control unit 140*a*. The system control unit 103*a* transmits to the decoder block 116*a* a decoder control signal corresponding to the operation command; thereby, the receiving drive unit 102 in the decoder block 116*a* reproduces image signals that are video/audio information recorded on the reproducing disk 101. The reproduced image signals include stream information and reproduction control information. The stream information is inputted into the stream control unit 110*a*, and then transmitted to the video/audio decoder unit 111 and decoded there; thus, the video signals and the audio signals corresponding to the video/audio information recorded on the reproducing disk 101 are outputted from the video/audio decoder unit 111. The video signals and the audio signals are transmitted to the display device 113 through the digital interface unit 112; thereby, the user can watch, using the display device 113, the video/audio information recorded on the reproducing disk 101.

Next, an operation of the image reproducing device 100 when the reproducing disk 101 is reproduced will be explained in more detail using FIG. 1.

The operation command to reproduce the reproducing disk 101, which is the user's request inputted from the operation unit 130*a*, is transmitted, after its content has been interpreted by the subsystem control unit 140*a*, as a control signal corresponding to the operation command, to the system control unit 103*a*. The system control unit 103*a* transmits to the decoder block 116*a* the decoder control signal corresponding to the operation command.

The system control unit 103*a* transmits a command to the reproducing drive unit 102 via the decoder control signal; first, reproduction control information related to the stream information to be reproduced, included in video signals of the video/audio information to be reproduced, recorded on the reproducing disk 101 is previously reproduced and obtained by the reproducing drive unit 102. The system control unit 103*a* saves the reproduction control information in the memory unit 120 so that the obtained reproduction control information can be instantaneously read out. The system control unit 103*a* reads out the reproduction control information, and orders the peripheral devices to prepare for reproduction. Then, the reproducing drive unit 102 reproduces the stream information recorded on the reproducing disk 101, and the reproduced stream information is outputted to the stream control unit 110*a*. The flow of the stream information after that is as already described above.

Here, the video/audio decoder unit 111 may be configured so that screen information of OSD (on screen display) for displaying, on the screen of the display device 113, an alarm message created by the system control unit 103*a*, an operation state of the device, and a function-selection screen is displayed by superimposing on the decoded video signals.

Next, a specific example of the operation-history information 153*a* stored in the memory unit 120 is explained. FIG. 2 illustrates a specific example of a data structure of the operation-history information 153*a* of the image reproducing device 100 according to Embodiment 1 of the present invention. The operation-history information 153*a* is segmented to be managed for each of predetermined time slots, in which information corresponding to one predetermined time slot is referred to as an operation-history record 200 as represented in FIG. 2. Here, in FIG. 2, the example is represented in which the operation-history record 200 keeps the information in a unit of 2-hours/record; however, the information may be segmented in a shorter time duration such as 1-hour/record or 30-minutes/record.

The operation-history record 200 is configured with time-management-table information 201 and device-operation information 202 in a specified time slot. The time-management-table information 201 includes a time-slot code 210, a start/finish time 211, and a silence flag 212. Here, the time-slot code 210 is identification information for uniquely specifying a predetermined time slot. The start/finish time 211 is configured with a start time and a finish time of the time-slot code 210, which indicates the time interval of the time slot. In FIG. 2, for example, "T02" indicates a time slot from 2:00 to 4:00.

The silence flag 212 is flag information representing whether it is a time slot during which the image reproducing device 100 needs silence, at night and in the early morning, etc. When the silence flag 212 is effective (□), by processing for setting the rotation speed of the disk in the reproducing drive unit 102 to be lower, etc., the image reproducing device 100 also considering the silence can be provided. In contrast, when the silence flag 212 is ineffective (x), the rotation speed of the disk in the reproducing drive unit 102 is kept to be a predetermined value. Here, the silence flag 212 may be configured to be automatically set by the system control unit 103*a* determining to be the nighttime, or to be manually determined for each of the time slots by the user using an initial-setting screen of the image reproducing device 100.

The device-operation information 202 is information representing operation histories, of the image reproducing device 100, segmented by the days of the week and the time slots. The device-operation information 202 is configured with a reproducing-device-operation state 220*a* that represents what is the operation having been used most by the image reproducing device 100 for each predetermined time period, and a this-week operation-history point 221, a one-week-before operation-history point 222 and a two-week-before operation-history point 223.

Here, regarding the operation-history points 221, 222, and 223, at a time point when an update operation is first performed in a specified time slot, zero point is set as an initial value; then, the value of the operation-history point 221 before zero point is set thereto is shifted to the one-week-before operation-history point 222, and the value of the operation-history point 222 before shifting is shifted to the two-week-before operation-history point 223. Therefore, the value having been set to the operation-history point 223 before shifting is deleted from the operation-history information 153*a*.

The reproducing-device-operation state 220a represents an operation state in which the image reproducing device 100 has been used most in the specified time slot. Information corresponding to the operation state such as "view (channel number)", or "play (DVD)" is recorded.

In the operation-history information 153a, latest update date-time information 230 is recorded each time when an update operation is performed.

Now, in this embodiment, the following explanation is performed, assuming that an operation state that has been used for the longest period in each predetermined time slot is set in the reproducing-device-operation state 220a. Here, the operation state having been used for a long period as described above may be recorded, or an operation state used last in each predetermined time slot may also be recorded.

Next, the this-week operation-history point 221, the one-week-before operation-history point 222, and the two-week-before operation-history point 223 each represent a total time when the electric-power supplying mode of the image reproducing device 100 is the normal mode, and their values are converted at the rate of 1 point/minute. That is, in this embodiment, because the time span of the operation-history record 200 is set to two hours (=2×60 minutes), regarding the operation-history points 221, 222, and 223, when they are updated, values are added to the points within a range from 0 to 120. For example, when the device is used and operated for 45 minutes within two hours of the predetermined time slot, a value of 45 points is counted. At that time, in a case of the operation-history information 153a being first updated in the predetermined time slot, zero point is set thereto as the initial value, and then 45 points are added thereto. In a case of the update operation being performed in the specified predetermined time slot for the second time or later, 45 points are further added to the value having been set.

As represented in FIG. 2, the device is configured so that information on the operation-history points for three-week periods that are this-week, one-week-before, and two-week-before ones can be recorded.

Figure 3:
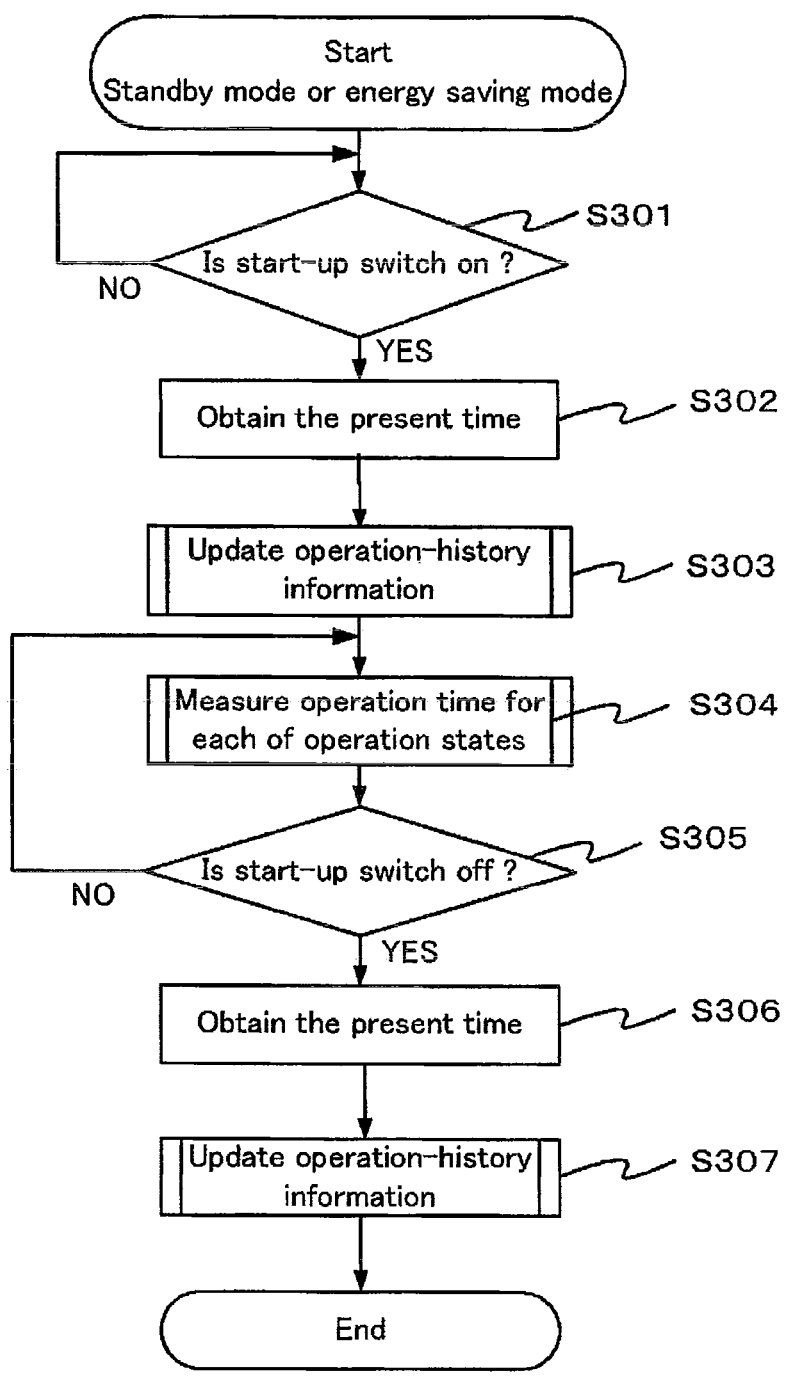
FIG. 3 is a flow chart explaining an operation when the operation-history information of the image reproducing device according to Embodiment 1 of the present invention is updated.

FIG. 3 is a flowchart for explaining an operation when the operation-history information 153a of the image reproducing device 100 according to Embodiment 1 of the present invention is updated.

As a precondition, assuming that the image reproducing device 100 is set to be in the standby mode or the energy saving mode, the update operation of the operation-history information 153a is explained using FIG. 3.

In FIG. 3, first, the subsystem control unit 140a waits until the mode is shifted to the normal mode from the standby mode or the energy saving mode (S301). Due to the start-up switch of the operation unit 130a being turned on, the subsystem control unit 140a is set to the normal mode, and electric power is supplied to the entire image reproducing device 100; then, the unit obtains the present-time information from the time acquisition unit 141 (S302).

Next, regarding the operation-history information 153a, the operation-history records 200 corresponding to a time period from a time recorded in the latest update date-time information 230 to the present time are updated (S303).

Using the operation-history information 153a illustrated in FIG. 2, an operation in a time period from 10:00 to 22:00 is explained below.

As the operation and its precondition in this time period, it is assumed that, after the date of "8/13/2007 Mon 9:30" has been recorded in the latest update date-time information 230, the image reproducing device 100 has been in the standby mode or the energy saving mode, and then, after the start-up switch of the operation unit 130a has been manually turned on at 16:30 of the same day, a program based on video/audio information recorded on a DVD has been watched until 21:00.

Because the latest update date-time information 230 is "8/13/2007 Mon 9:30", and the time when the start-up switch has been turned on is 16:30 of the same day, the this-week operation-history points 221 from the operation-history record 200 whose time-slot code 210 is T06 through the operation-history record 200 whose time-slot code 210 is T08 are determined. Practically, because the image reproducing device 100 has been in the standby mode, for the time slots from T06 to T08, each update operation is the first one, so that in each of the operation-history points 221 of the history records 200, zero point is added to zero point of the initial value, and thus the point remains at zero.

Subsequently, the subsystem control unit 140a monitors an operation time for each of reproducing-device operation states after the start-up switch has been turned on and the device has been set to the normal mode (S304); thus, the value of each operation-history point 221 of each operation-history record 200 corresponding to each time-slot code 210 is sequentially determined.

For time slots whose time-slot codes 210 are from T09 to T10, the subsystem control unit 140a sets to the reproducing-device-operation state 220a "play (DVD)" which is an operation state in which the image reproducing device 100 has operated for the longest time period.

Subsequently, it is assumed that, when the present time reaches 21:00, the user inputs into the operation unit 130a an operation command for turning off the start-up switch to shift to the standby mode. Then, the subsystem control unit 140a recognizes that the start-up switch of the control unit 130a is turned off (S305), and obtains present-time information from the time acquisition unit 141 (S306).

Next, the operation-history point 221 in the time slot whose time-slot code 210 is T11 is set to 60 points corresponding to one hour while the operation state has been the "play (DVD)", and the operation state in which the image reproducing device 100 has been used for the longest time period in a time slot from 20:00 to 22:00 is recorded in the reproducing-device-operation state 220a; further, by setting the present time into the latest update date-time information 230, the operation-history information 153a is updated (S307). Subsequently, the electric-power supplying mode of the image reproducing device 100 shifts to the standby mode.

FIG. 4 is an explanatory diagram representing a method for calculating a device-usage probability 410 of the image reproducing device 100, on the basis of the operation-history points 221, 222, and 223 explained in Embodiment 1 of the present invention.

Using "X" as a value of a weighting factor 401 for the this-week operation-history point 221, "Y" as a value of a weighting factor 402 for the one-week-before operation-history point 222, and "Z" as a value of a weighting factor 403 for the two-week-before operation-history point 223, the device-usage probability 410 is calculated by calculation represented in FIG. 4. Regarding the "X", "Y", and "Z" as values of the weighting factors, the older the history is, the smaller value is set. With respect to these factors, the image reproducing device 100 may previously keep initial values, or may be set in accordance with input into the operation unit 130a due to a user's operation command.

As represented in FIG. 4, the device-usage probability 410 is calculated by "the operation-history point 221×the weighting factor 401+the operation-history point 222×the weighting factor 402+the operation-history point 223×the weighting factor 403".

Specifically, for the operation-history record 200 whose time-slot code 210 is a time slot of T04 in FIG. 4 and FIG. 2, the device-usage probability 410 is calculated to obtain a value of 86.25 as represented in FIG. 4.

Figure 5:
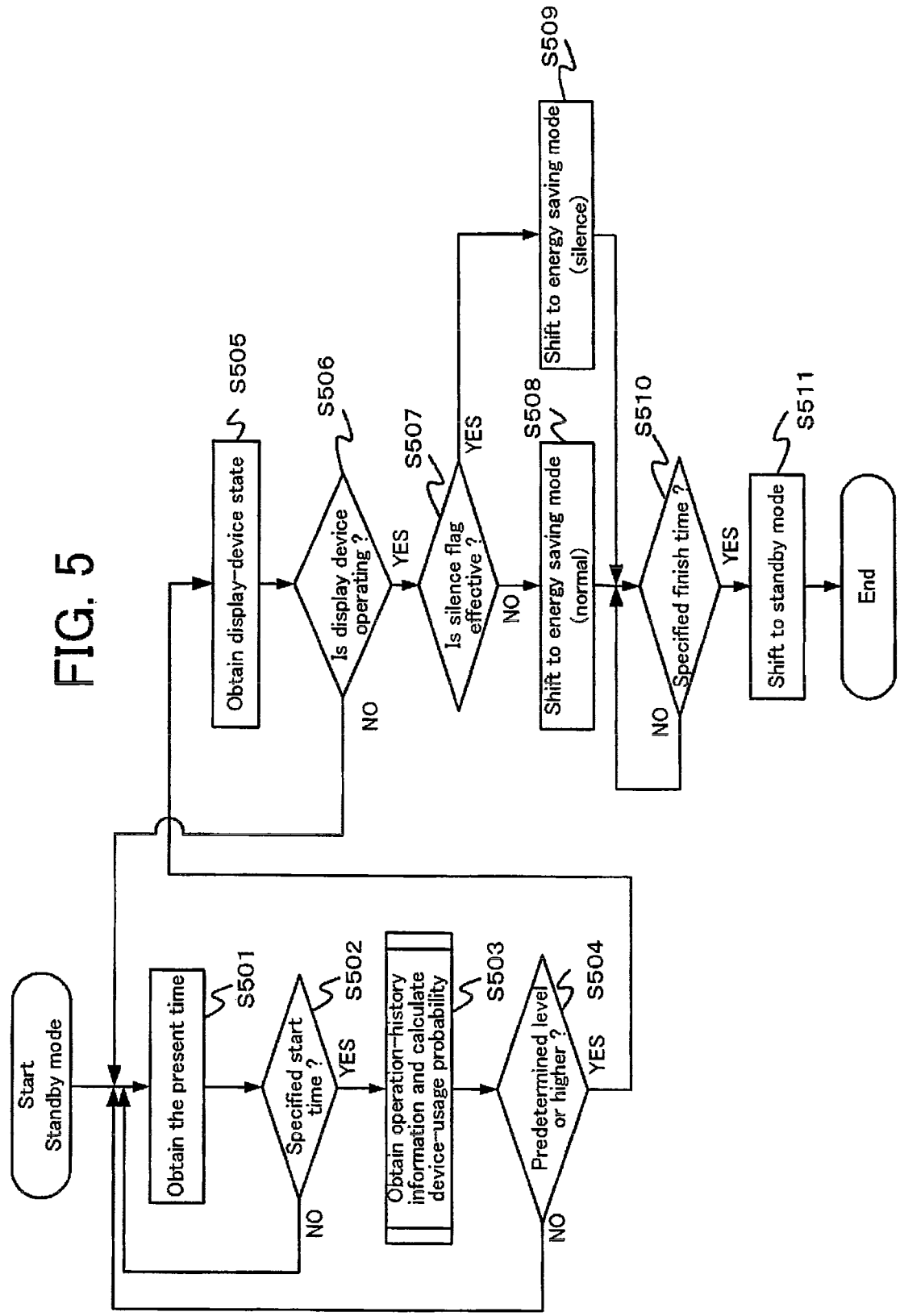
FIG. 5 is a flow chart representing operation flow of the image reproducing device according to Embodiment 1 of the present invention.

FIG. 5 is a flowchart representing an operation flow of the image reproducing device 100 according to Embodiment 1 of the present invention. An operation that the electric-power supplying mode of the image reproducing device 100 shifts from the standby mode to the energy saving mode is explained in detail using FIG. 5. Here, as a starting condition in the flowchart, the initial electric-power supplying mode is assumed to be the standby mode.

First, the subsystem control unit 140a obtains a present time from the time acquisition unit 141 (S501). Subsequently, until a start time of a time slot of the time-slot code 210, set in the nearest future from the present time, the subsystem control unit 140a waits for the start time while holding a standby state for operation-command input into the operation unit 130a by the user (S502). When the start time of the time slot of the time-slot code 210 is reached, the subsystem control unit 140a reads out the operation-history information 153a, of the image reproducing device 100, stored in the memory unit 120; then, on the basis of values of the operation-history points 221, 222, and 223 included in the operation-history record 200 corresponding to the time slot of the time-slot code 210 in the operation-history information 153a, the device-usage probability 410 is calculated using the weighting factors 401, 402, and 403 represented in FIG. 4, and the calculation method of the device-usage probability 410 represented in FIG. 4 (S503).

Next, the subsystem control unit 140a compares the calculated value of the device-usage probability 410 with a predetermined first level previously held (S504). Here, the predetermined first level may be automatically calculated from the average value of the operation-history points 221, 222, and 223 included in the operation-history information 153a, etc., or may be set by being inputted into the operation unit 130a by the user.

When the value of the device-usage probability 410 is not lower than the predetermined first level, the image reproducing device 100 is determined to be probably used in the present time, the processing shifts from Step S504 to Step S505. While, when the value of the device-usage probability 410 is lower than the predetermined first level, the processing returns to Step S501, and the processing described above is repeated.

Due to the configuration of the above operation flow, because of preventing needless communication between the image reproducing device 100 and the display device 113 described later, load of the subsystem control unit 140a can be reduced.

After the processing has shifted from Step S504 to Step S505, in the display-device-information acquisition unit 151 provided inside the subsystem control unit 140a, operation-state information on the display device 113 such as information whether electric power is supplied and display-screen information are obtained (S505). Here, at that time, display-device states such as a screen displaying content of the display device 113, a receiving channel, and an output audio level may also be obtained.

Next, on the basis of the operation-state information, on the display device 113, obtained by the display-device-information acquisition unit 151, determination is performed whether or not the display device 113 is in a power-on state and in a state in which a screen displaying operation can be performed (S506). If the display device 113 is in a normally operating state, the processing shifts to Step S507. Meanwhile, if the display device 113 is in the standby mode or in the power-off state, the processing is again repeated from the Step S501.

In Step S507, information of the silence flag 212 included in the operation-history record 200 of the time-slot code 210 for the time slot in which the present time is included is obtained by the subsystem control unit 140a; then, when the silence flag 212 has been set ineffective (x), the processing shifts to Step S508, while when the silence flag 212 has been set effective (□), the processing shifts to Step S509.

In Step S508, after the electric-power supplying mode of the image reproducing device 100 has been changed from the standby mode to the energy saving mode, the processing shifts to Step S510. On the other hand, in Step S509, the electric-power supplying mode of the image reproducing device 100 is changed from the standby mode to the energy saving mode in consideration of achieving silence by reducing the rotation speed of the disk in the reproducing drive unit 102, etc.; then, the processing shifts to Step S510. Here, when the mode is changed to the energy saving mode, with respect to only constituent devices for normally operating the operation state of the image reproducing device 100 based on the reproducing-device-operation state 220a in the operation-history record 200 for the specified time slot, electric power supply and starting may be performed. For example, when a DVD reproducing operation is performed, because an operation of the broadcast receiving unit 106 is needless, processing may be performed that devices constituting the broadcast receiving unit 106 are not started.

In a case of an output audio level, of the display device 131, obtained by the display-device-information acquisition unit 151 being relatively high, even though the silence flag 212 is effective (□), the processing may be configured to shift from Step 507 to Step 508.

Until the time-slot finish time of a continuous time-slot code 210 where the value of the device-usage probability 410 is not lower than that of the first level, the energy saving mode is continued (S510). However, if the start switch of the image reproducing device 100 is turned on during the continuity of the mode due to an operation command inputted into the operation unit 130a by the user, the energy saving mode is cancelled, and the mode is to be changed to the normal mode. Additionally, when reaching the finish time of the time slot of the time-slot code 210, the processing shifts from Step S510 to Step S511, and the electric-power supplying mode is changed to the standby mode.

Here, regarding the above explained time-slot finish time of the time-slot code 210, because the electric-power supplying mode is once set to the standby mode before an operation in the next time slot starts, the system is configured to regard to reach the finish time a little earlier than the actual finish time of the time slot. For example, in FIG. 2, when the time-slot code 210 is T07, the time slot is from 12:00 to 14:00; however, in Step S502 in the operation flow represented in FIG. 5, at a time when the present time reaches 12:00, it is determined that the time reaches the specified start time; oppositely, in Step 510, at a time when the present time reaches a time a little earlier than 14:00, for example, reaches 13:59, the system is configured to determine that the time reaches the specified finish time.

As described above, in the image reproducing device 100 according to Embodiment 1, because a time slot in which the device-operation track record of the image reproducing device 100 shows frequent use, and a display-operation state of the display device 113 (electric-power being supplied or not, and displaying content) can be determined, only in a time slot in which the probability where the user uses the image reproducing device 100 is relatively high, the electric-power supplying mode of the image reproducing device 100 can be set to change from the standby mode to the energy saving mode. Therefore, an effect can be obtained that the image reproducing device 100 having a high energy saving effect, while keeping responsiveness to the user's operation, can be provided.

Because the device-usage probability 410 is automatically updated in the image reproducing device 100, special operations by the user are absolutely needless; therefore, an effect can be obtained that the process is fuss-free. Moreover, because the device-usage probability 410 is calculated, using previous statistical information during a certain period, from the latest information with a weighting factor, the calculation is performed with emphasizing new information data, but without depending only on the new information data therefore, the probability can be obtained as reliable statistical information.

When the mode has shifted to the energy saving mode, in time slots late in the night or in the early morning, etc., the device can be shifted, using the silence flag 212, to a silence state. Thereby, due to the rotation speed of the disk being controlled to be low, user comfort is improved. Due to decreasing the rotation speed of the disk, a heat-generation amount in the image reproducing device 100 can also be reduced; therefore, influences upon the surrounding devices can also be reduced. On the other hand, when the output audio level of the display device 113 is relatively high, the device can be shifted to a state in which, although the silence is relatively low, the responsiveness to the user's operation is relatively high.

When the mode is changed to the energy saving mode, in a case in which electric power supply and starting are performed with respect to only constituent devices for normally operating the operation state of the image reproducing device 100, on the basis of the reproducing-device-operation state 220a in the operation-history record 200 for the specified time slot, only devices with respect to an operation by which the device has been most frequently operated in the operation-command track record in the previous specified time slot are to be driven; therefore, electric-power consumption in the entire image reproducing device 100 can be reduced.

Moreover, also in a case of the user forgetting to switch off the power of the image reproducing device 100, on the basis of a state whether an image is outputted to the display device 113, or of a time during which the user has not inputted an operation command, the image reproducing device can be determined not to be used by the user. In a case in which the image reproducing device 100 is determined not to be used by the user, because the electric-power supplying mode is automatically shifted to the standby mode, useless electric-power consumption can be reduced. Additionally, an effect can be obtained That reliability as statistical information of the device-usage probability 410 can also be improved.

Embodiment 2

In Embodiment 1 according to the present invention, regarding the case in which an optical disk is used as an information recording medium as an example, the image reproducing device in which an optical disk is used as the reproducing disk and that reproduces in the reproducing drive unit the video/audio information recorded on the optical disk has been explained. In Embodiment 2, regarding a case in which a hard disk is used as an example of the information recording medium, an image recording/reproducing device provided with a recording/reproducing drive unit, for example, in which program video/audio information obtained by receiving a digital broadcast can be recorded on the hard disk, and that can reproduce the audio/video information recorded on the hard disk is explained.

Here, in the image recording/reproducing device according to Embodiment 2, it is needless to say that the information recording medium is not limited to the hard disk, but, for example, an optical disk which can record and reproduce video/audio information may be used.

Figure 6:
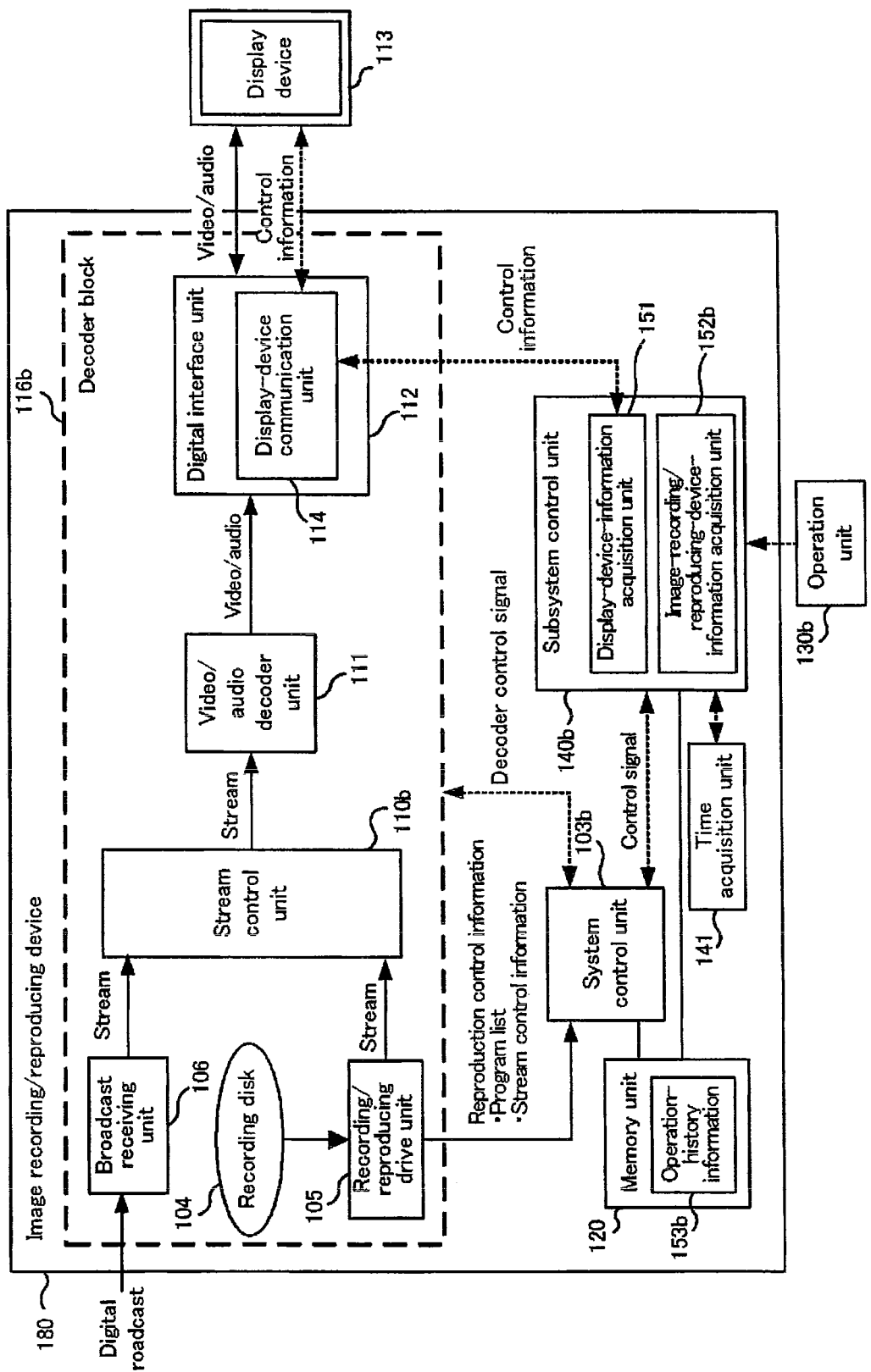
FIG. 6 is a configuration diagram illustrating an example configuration of an image recording/reproducing device according to Embodiment 2 of the present invention.

FIG. 6 is a configuration diagram illustrating an example of a configuration of the image recording/reproducing device according to Embodiment 2 of the present invention. An image recording/reproducing device 180 in Embodiment 2 has a configuration substantially and approximately same as that of the image reproducing device 100 in Embodiment 1 except for the following points: the information recording medium is, for example, a hard disk as a recordable recording disk 104, accordingly a recording/reproducing drive unit 105 capable of recording and reproducing is provided instead of the reproducing drive unit 102, a stream control unit 110b is configured so that not only stream information reproduced by the recording/reproducing drive unit can be inputted, but stream information of a digital broadcasting program from the broadcast receiving unit 106 can be outputted to the recording/reproducing drive unit 105, the system control unit 103b outputs to the recording/reproducing drive unit 105 reproduction control information received from the stream control unit 110b, an operation unit 130b can command operation to record on the recording disk 104, in addition to operations to receive the digital broadcast and reproduce the reproducing disk, a subsystem control unit 140b can also interpret operation commands with respect to recording inputted from the operation unit 130b, an image-recording/reproducing-device-information acquisition unit 152b can obtain operation-state information with respect to recording of the image recording/reproducing device 180, and a decoder block 116b records and reproduces the stream information on the basis of a decoder control signal outputted from the system control unit 103b. This image recording/reproducing device 180 is also provided with a plurality of electric-power supplying modes referred to as "normal mode", "standby mode", and "energy saving mode" similar to those in the image reproducing device 100 according to Embodiment 1. Here, because the same symbols as those in FIG. 1 represent the same or equivalent elements, their explanations are omitted.

In FIG. 6, a case in which video/audio information, of a digital broadcast, received by the broadcast receiving unit 106 is recorded on the recording disk 104, which is, for example, a hard disk, is explained below.

If the user inputs into the operation unit 130b an operation command to record a digital broadcast onto the recording disk 104, the operation command is interpreted by the subsystem control unit 140b. The subsystem control unit 140b transmits to the system control unit 103b the content of the operation command as a control signal. The system control unit 103b transmits to the decoder block 116b a decoder control signal based on the operation command.

Next, the broadcast receiving unit 106 included in the decoder block 116b receives a digital broadcast on the basis of the decoder control signal, and stream information of received video/audio information is outputted to the stream control unit 110b. The stream information is transmitted to the recording/reproducing drive unit 105, and recorded on the recording disk 104 being the hard disk. The stream control unit 110b notifies the system control unit 103b of reproducing-start-time information and reproducing-start-position information that constitute reproduction control information, and attribute information of image information, etc., for every GOP unit which is an access unit. Then, the system control unit 103b transmits to the recording/reproducing drive unit 105 the reproduction control information received, and the information is sequentially recorded on the recording disk 104; thereby, the recording operation has been performed.

The operation of the image recording/reproducing device 180 for reproducing video/audio information recorded on the recording disk 104 is similar to the case of the image reproducing device 100 according to Embodiment 1; therefore, its explanation is omitted.

In the above description, a case has been explained in which, when user's operation command with respect to recording is inputted into the operation unit 130b, the image recording/reproducing device operates so that the video/audio information of the digital broadcast is recorded on the recording disk 104 in real time; however, in the following description, a case is explained in which, after an operation command for programmed recording has been previously inputted by the user into the operation unit 130b, the image recording/reproducing device 180 operates in accordance with the start time and finish time of the programmed recording.

In FIG. 6, the subsystem control unit 140b also takes a role for starting up the image recording/reproducing device 180 when the programmed recording starts. After the user has inputted into the operation unit 130b the operation command of the programmed recording, and the start time and finish time of the programmed recording, as setting contents of the command, the subsystem control unit 140b operates to store the setting contents in the memory unit 120.

Next, the subsystem control unit 140b obtains the present time by the time acquisition unit 141, and the time is successively compared with the programmed-recording start time; thereby, the start-up time of the image recording/reproducing device 180 is recognized. That is, when the present time agrees with the programmed-recording start time, the subsystem control unit 140b determines that the time reaches the start-up time of the image recording/reproducing device 180, and processes as if the start-up switch of the control unit 130b is turned on. Regarding the programmed-recording finish time, similar processing is performed, and, when the present time agrees with the programmed-recording finish time, the subsystem control unit 140b determines that the time reaches the finish time of the image recording/reproducing device 180, and processes as if the start-up switch of the control unit 130b is turned off.

Here, the image-recording/reproducing-device-information acquisition unit 152b provided inside the subsystem control unit 140b obtains device-operation track record of the image recording/reproducing device 180 (user's device-usage track record). The device-operation track record of the image recording/reproducing device 180 according to Embodiment 2 is fundamentally similar to that of the image reproducing device 100 explained in Embodiment 1, but only a point in which recording operations of video/audio information are added is different. The recording in this case includes both of real-time recording and programmed recording.

FIG. 7 is a diagram representing a specific example of a data structure of operation-history information 153b, of the image recording/reproducing device 180, stored in the memory unit 120. Here, because the symbols that are the same as those in FIG. 2 represent the same or equivalent elements, their explanations are omitted.

In FIG. 7, the operation-history information 153b is segmented to be managed for each of predetermined time slots, which is similar to the operation-history information 153a represented in FIG. 2 explained in Embodiment 1 except for the operation with respect to the recording. In a recording/reproducing-device-operation state 220b, included in the operation-history information 153b of the image recording/reproducing device 180, represented in FIG. 8, an operation of video/audio-information recording is added to the operations in the case of the reproducing-device-operation state 220a in Embodiment 1.

Next, regarding the method of giving points corresponding to the this-week operation-history point 221, the one-week-before operation-history point 222, and the two-week-before operation-history point 223, in a case of the "view (channel number)" and "play (HD)" whose operation states are similar to those of the image reproducing device 100, a similar method can also be applied to the image recording/reproducing device 180, in which the points each represent total times during which electric-power supplying mode of the image recording/reproducing device 180 is the normal mode, and they are converted by one point per minute. That is, in this embodiment, because the operation-history record 200 has a unit of 2 hours (=2×60 minutes), in each of the operation-history points 221, 222, and 223, addition of a value is performed within a range from 0 to 120. When the update operation in a time slot of interest is the first time, 0 point is set as the initial value, and then the addition is performed, while, when the update operation in the time slot is the second time or later, the addition is further performed on the previously set value.

On the other hand, in a case in which, due to the image recording/reproducing device 180 reaching the programmed-recording start time, the start-up switch of the control unit 130b is considered to be turned on, and the electric-power supplying mode shifts from the standby mode or the energy saving mode to the normal mode, there is a high possibility that the user is absent in the neighborhood of the image recording/reproducing device 180; as a result, because there is a low possibility that the user directly operates the image recording/reproducing device 180, the point may be set lower, different from the normal point-giving method. For example, when the image recording/reproducing device 180 shifts to the normal mode due to the programmed recording, values obtained by multiplying normal points by a weighting factor (a value smaller than 1.0, set at 0.5 in this embodiment) are added to the respective operation-history points 221, 222, and 223.

For example, the this-week operation-history point 221 in which the time-slot code 210 represented in FIG. 7 is T05 is an example of a case in which programmed recording is performed for only 60 minutes from 8:30 to 9:30. In a case of the image recording/reproducing device 180 operating for watching a digital broadcast or reproducing a DVD or HDD, 60 points are given as a normal point; however, because the image recording/reproducing device 180 has operated as the programmed recording during the time slot, 30 points obtained by multiplying 60 points by the weighting factor of 0.5 are added, Here, because the update operation is the first time for the specified time slot, the point is set to the initial value of 0 point, and then 30 points are added thereto. In this way, the operation-history information 153b considering a probability that the user directly operates the image recording/reproducing device 180 can be stored in the memory unit 120.

Figure 8:
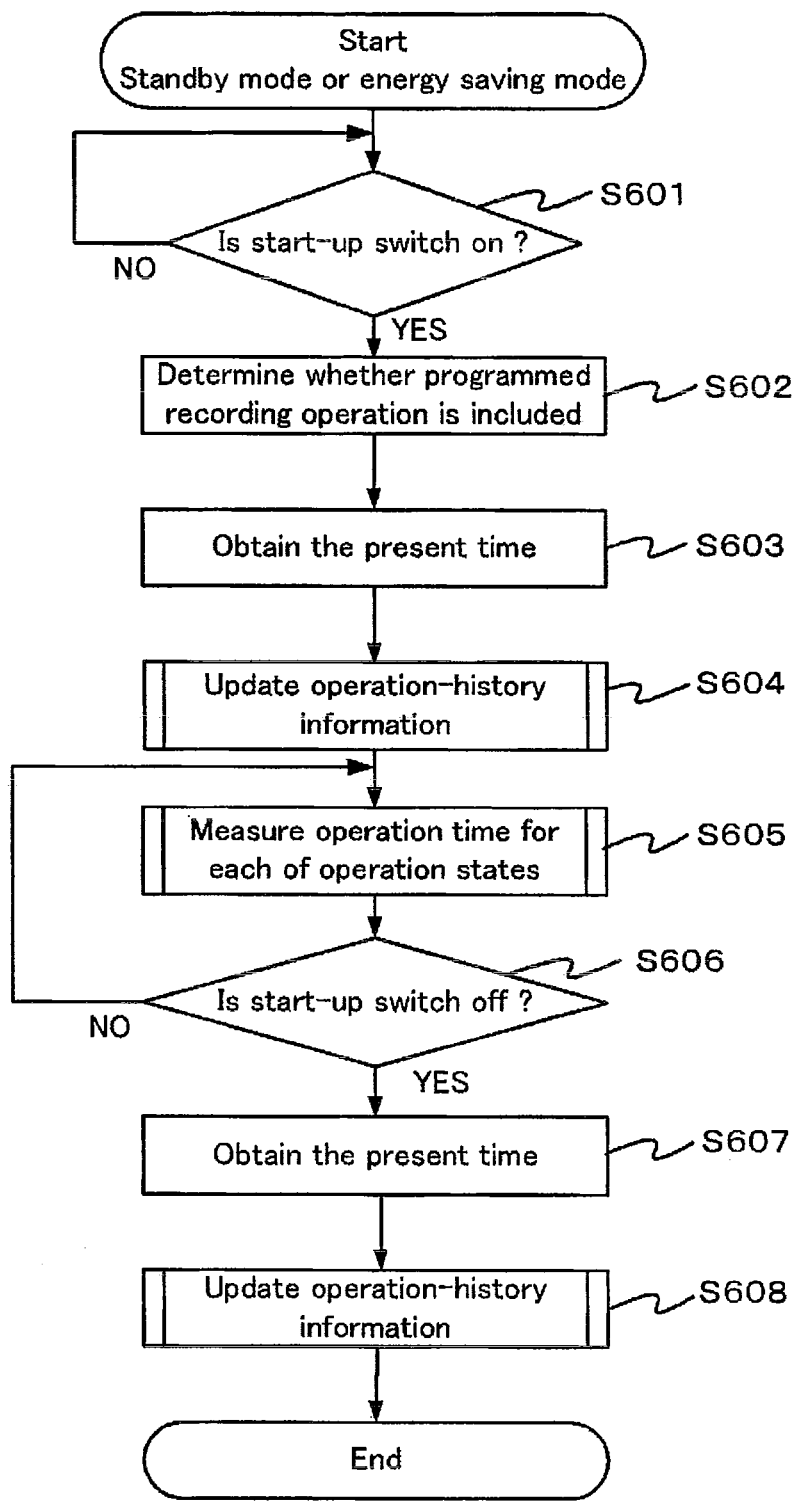
FIG. 8 is a flow chart explaining an operation when the operation-history information of the image recording/reproducing device according to Embodiment 2 of the present invention is updated.

FIG. 8 is a flow chart for explaining an operation when the operation-history information 153b of the image recording/reproducing device 180 according to Embodiment 2 of the present invention is updated. A point, in which a step of determining whether the programmed recording is present is added, is different from that in FIG. 3 which is the flow chart for explaining the operation when the update of the image reproducing device 100 is performed.

In FIG. 8, first, the subsystem control unit 140b waits until the mode shifts from the standby mode or the energy saving mode to the normal mode (S601). In the subsystem control unit 140b, when the start-up switch of the control unit 130b is turned on to set to the normal mode, and electric power is supplied to the entire image recording/reproducing device 180, then the device determines whether the power-on state is caused by the user's request or the programmed recording operation, and the determination result is stored in the memory unit 120 (S602).

Subsequently, the subsystem control unit 140b obtains the present time information from the time acquisition unit 141 (S603), and the operation-history records 200 corresponding to time slots from the latest update date-time information 230 of the operation-history information 153b to the present time are updated (S604).

Here, using the operation-history information 153b illustrated in FIG. 7, with respect to the time slot, from 8:00 to 10:00, whose time-slot code is T05, an operation when the operation-history information 153b of the image recording/reproducing device 180 is updated, represented in the flow chart of FIG. 8 is explained below in detail.

As the operation and its precondition in this time slot, the programmed recording is assumed to be set from 8:30 to 9:30 on Monday, Aug. 13, 2007. That is, the date-time of 8/13/2007 Mon 8:00 has been previously set in the latest update date-time information 230; then, the electric-power supplying mode has been the standby mode from 8:00 to 8:30, and, at a time when the time reaches 8:30 as the programmed-recording start time, the start-up switch is considered to be turned on, and thereby the mode is assumed to shift to the normal mode. After the time has reached the finish time of the programmed recording at 9:30 on the same day, the start-up switch is considered to be turned off, and thereby the electric-power supplying mode is assumed to shift to the standby mode. Moreover, the start-up switch of the operation unit 130b is manually turned on at 16:30 on the same day, and then a program based on video/audio information recorded on the recording disk 104 being a hard disk is assumed to be viewed until 21:00.

The latest update date-time information 230 is 8/13/2007 8:00, and the time when, after the present time reaches the start time of the programmed recording, the start-up switch of the operation unit 130b is considered to be turned on is 8:30 on the same day; therefore, the operation-history point 221 of the time slot in the time-slot code of T05 is updated. Because the operation is the first update for the specified time slot, 0 point is set thereto.

Next, the subsystem control unit 140b monitors an operation time for each of recording/reproducing-device operation states after the start-up switch has been turned on and the device has been set to the normal mode (S605); thus, the value of each operation-history point 221, of the operation-history record 200 corresponding to each time-slot code 210 is sequentially determined.

Specifically, in the image recording/reproducing device 180, because programmed recording is performed, from 8:30 to 9:30, on the recording disk 104 being the hard disk, the start-up switch is considered to be turned off at 9:30 (S606), and the present time 9:30 at that time point is obtained from the time acquisition unit 141 (S607). Because the measured operation time of the programmed recording is 60 minutes, and the weighting factor is 0.5, the value of 30 points obtained by multiplying 60 points by the factor is added to the operation-history point 221 in the time slot of the time-slot code T05; consequently, this value of 30 points is added to that of 0 point previously set, and a value of 30 points is resultantly obtained. The operation-history information 153b is updated (S608).

Due to the start-up switch being considered to be turned off at 9:30, the electric-power supplying mode in the image recording/reproducing device 180 shifts from the normal mode to the standby mode.

Subsequently, the subsystem control unit 140b again monitors the start-up switch to be turned on (S601); then, when the switch of the operation unit 130b is manually turned on at 16:30, whether the programmed recording is present or not is determined (S602).

The subsystem control unit 140b obtains present-time information from the time acquisition unit 141 (S603), and updates the operation-history information 153b of the image recording/reproducing device 180 (S604). Because the present time is 16:30, the values of this-week operation-history point 221 from the operation-history record 200 in the time slot of the time-slot code 210 of T05 to that of T08 are determined. Actually, the value of the this-week operation-history point 221 in the time slot of T05 is 30 points, and all of the this-week operation-history points 221 from T06 to T08 become 0 point.

The subsystem control unit 140b monitors an operation time for each of the recording/reproducing-device operation state after the start-up switch has been turned on, and the mode has been set to the normal mode (S605); thus, the operation-history point 221 of the operation-history record 200 corresponding to each time-slot code 210 is sequentially determined.

The subsystem control unit 140b sets to the recording/reproducing-device-operation state 220b the "play (HD)", which is an operation state in which the image recording/reproducing device 180 has operated for the longest period during the time slots of the time-slot code 210 from T09 to T10.

Subsequently, when the present time becomes 21:00, an operation command to turn off the start-up switch to shift the mode to the standby mode is assumed to be inputted by the user into the operation unit 130b. Then, when the subsystem control unit 140b recognizes that the start-up switch of the control unit 130b is turned off (S606), present-time information is obtained from the time acquisition unit 141 (S607).

The operation-history point 221 in a time slot of the time-slot code 210 of T11 is set to 60 points corresponding to one hour for which the operation state has been the "play (I-ID)", an operation state of the image recording/reproducing device 180, used for the longest period during a time slot from 20:00 to 22:00 is recorded in the recording/reproducing-device-operation state 220b, and then the present time is set to the latest update date-time information 230; thereby, the operation-history information 153b is updated (S608). Subsequently, the electric-power supplying mode of the image recording/reproducing device 180 is shifted to the standby mode.

In a case of the user having set the programmed recording, when the image recording/reproducing device operates recording, it is generally probable that the user is absent in the vicinity of the image recording/reproducing device. Therefore, in the case of the programmed recording, its energy saving characteristics are desired to be more increased without increasing its responsiveness so much, comparing to a case in which the user can directly operate the image recording/reproducing device. Accordingly, as described above, in the case of the programmed recording, by setting smaller points to be given compared with a case in which the user can directly operate recording, the energy saving characteristics can be further improved without deteriorating the responsiveness so much.

Embodiment 3

In the image reproducing device 100 according to Embodiment 1, and the image recording/reproducing device 180 according to Embodiment 2, when it is determined on the basis of the information of the operation state of the connected display device 113 that the image reproducing device 100 or the image recording/reproducing device 180 is probably used by the user, the electric-power supplying mode is made to be shifted from the standby mode to the energy saving mode; however, on the other hand, if the mode is made to be shifted from the normal mode or the energy saving mode to the standby mode when the device is determined unlikely to be used by the user, energy saving characteristics can be improved without deteriorating its responsiveness so much.

Figure 9:
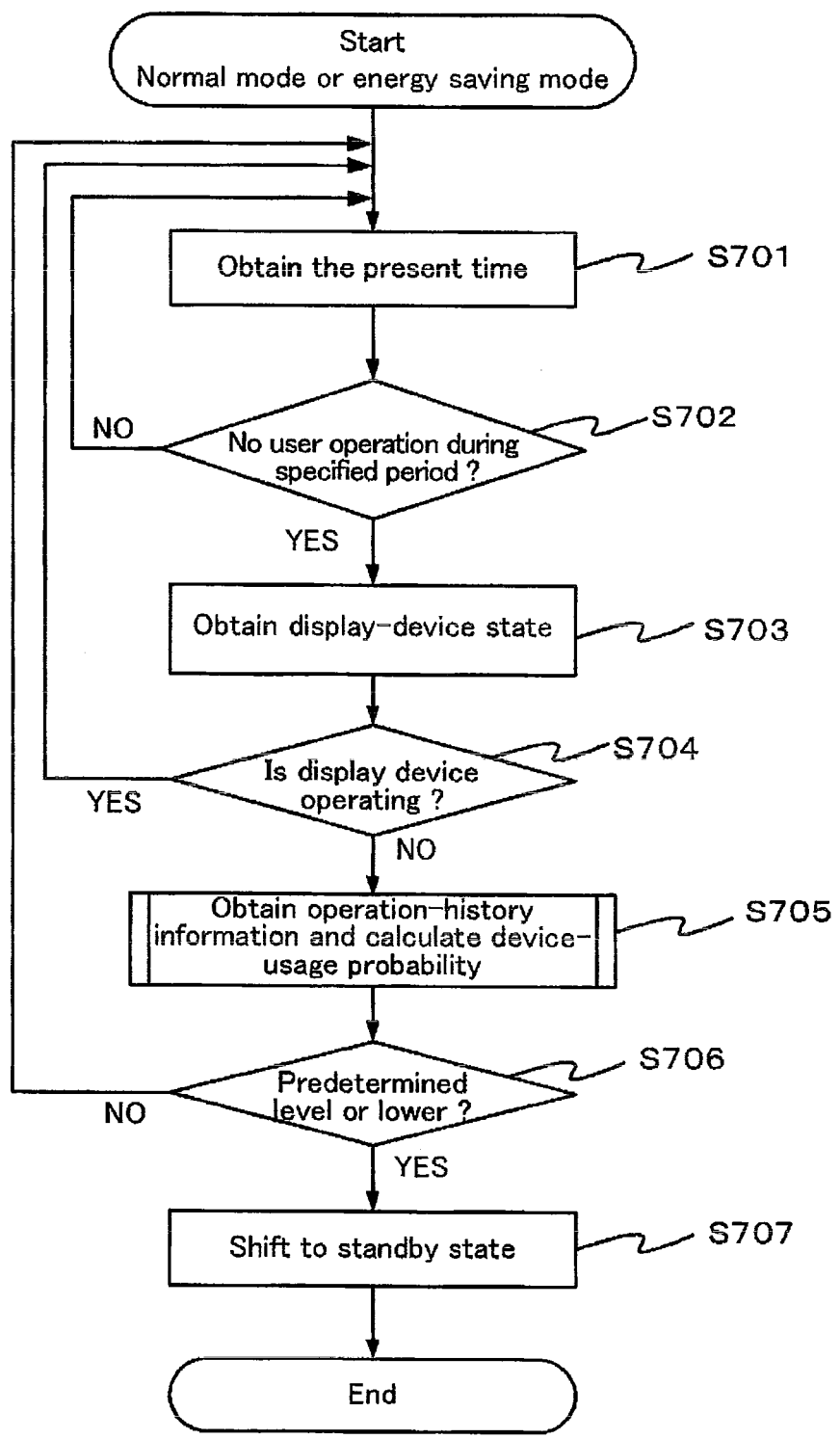
FIG. 9 is a flow chart representing operation flow of the image reproducing device according to Embodiment 3 of the present invention.

FIG. 9 is a flow chart representing an operation flow of an image reproducing device according to Embodiment 3 of the present invention. An operation, in which the electric-power supplying mode of the image reproducing device according to Embodiment 3 shifts from the normal mode or the energy saving mode to the standby mode, is explained in detail using FIG. 9. Here, as a start requirement of the flow chart, the initial electric-power supplying mode is assumed to be the normal mode or the energy saving mode.

Here, because, regarding the image reproducing device according to Embodiment 3, compared with the image reproducing device 100 according to Embodiment 1, the configuration is the same and only the operation flow is different, assuming that the image reproducing device 100 illustrated in FIG. 1 is the image reproducing device according to Embodiment 3, an operation that the electric-power supplying mode is shifted is explained below using FIG. 9 and FIG. 1. In the following explanation, although only a case of the image reproducing device is explained, it is needless to say that the operation flow represented in FIG. 9 can be also applied to an image recording/reproducing device.

In FIG. 9, first, the subsystem control unit 140a obtains the present time from the time acquisition unit 141 (S701). Next, in a case of the subsystem control unit 140a determining, considering a difference between a time when the user has last operated and the present time, that no user operation is performed during a specified period, the processing transits to S703. While, in a case of a user operation having been performed during the specified period, the processing is performed again from the step S701.

Subsequently, in the display-device-information acquisition unit 151 provided inside the subsystem control unit 140a, operation-state information on the display device 113 such as information whether electric power is supplied and display-screen information are obtained (S703). Here, at that time, display-device states such as a screen displaying content of the display device 113, a receiving channel, and an output audio level may also be obtained.

Next, on the basis of the operation-state information, on the display device 113, obtained by the display-device-information acquisition unit 151, determination is performed whether or not the display device 113 is in a power-on state and in a state in which a screen displaying operation can be performed (S704). When the display device 113 does not operate to display, the processing shifts to Step S705. While, when the display device 113 operates to display, the processing is again repeated from the Step S701.

In Step S705, the subsystem control unit 140a obtains the operation-history information 153a kept in the memory unit 120, and calculates the device-usage probability 410 explained by the representation in FIG. 4 (S705).

Next, the subsystem control unit 140a compares the calculated value of the device-usage probability 410 with a previously-kept predetermined second level (S706). Here, the value of the predetermined second level is set lower than that of the predetermined first level explained in Embodiment 1.

When the device-usage probability 410 is not higher than the predetermined second level, the probability that the image reproducing device 100 is used by the user at the present time is determined to be low, the processing shifts to Step S707, and the image reproducing device 100 is set to the standby mode. While, when the device-usage probability 410 is higher than the predetermined second level, the processing is again repeated from the Step S701.

Because the image reproducing device 100 according to Embodiment 3 is configured to operate as above, in a time slot where the time period during which the image reproducing device 100 is used by the user is relatively short, and also if the display device 113 is not in operation, the probability that the image reproducing device is used by the user is extremely low; therefore, the electric-power supplying mode is set from the normal mode or the energy saving mode to the standby mode, and an effect is resultantly obtained that the energy saving characteristics can be extremely improved in a state in which the responsiveness is not so much required. Here, it is needless to say that, even if the operation flow represented in FIG. 9 is applied to the image recording/reproducing device 180, a similar effect can also be obtained.

What is claimed is:

1. An image reproducing device comprising:
   a reproducing drive unit for reproducing an image signal recorded on a recording medium;
   a broadcast receiving unit for receiving a broadcast signal;
   an operation-state-information acquisition unit for obtaining operation-state information of a display device for displaying the reproduced image signal;
   an operation-time-information acquisition unit for obtaining information on an operation time during which the reproducing drive unit and the broadcast receiving unit have been operated in accordance with the operation command;
   an operation input unit for inputting an operation command to operate the image reproducing device;
   a point giving unit for giving a point for each of predetermined time slots according to the operation-time information;
   a storage unit for storing the point given for each of the predetermined time slots and an operation state in each of the predetermined time slots as operation-history information, the operation state representing a reproducing state in which the reproducing drive unit is operated or a viewing state in which the broadcast receiving unit is operated; and
   a mode setting unit for setting a electric-power supplying mode to the image reproducing device according to the operation-history information and the operation-state information, the electric-power supplying mode including a normal mode for supplying electric power to all of a plurality of devices including the reproducing drive unit and the broadcast receiving unit, a standby mode for supplying electric power to a device that enables the operation input unit to operate, and an energy saving mode for supplying electric power to a device that enables the operation input unit to operate and one unit selected from the reproducing drive unit and the broadcast receiving unit.

2. An image reproducing device as recited in claim 1, wherein:
   the operation-state information indicates whether the display device is running or suspended;
   the operation-time information includes an operation start time and an operation end time of the image reproducing device;
   the point given by the point giving unit for each of the predetermined time slots can be obtained by calculating usage probability of the image reproducing device for each of the time slots from the operation start time and the operation end time; and
   the mode setting unit sets the electric-power supplying mode to the energy saving mode; when the point is higher than a predetermined first level and the operation-state information indicates that the display device is running.

3. An image reproducing device as recited in claim 1, wherein the point giving unit gives the higher weighting factor when the information history is new.

4. An image reproducing device as recited in claim 2, wherein:
   the storage unit stores silence flag information added to the operation-history information; for each of the predetermined time slots, the silence flag information being used for determining whether the rotation speed of the recording medium is decreased from that speed when reproducing; and
   the mode setting unit controls the rotation speed of the drive unit according to the stored silence flag information added to the operation-history information when the electric-power supplying mode is set to the energy saving mode.

5. An image reproducing device as recited in claim 1, wherein the operation-state information indicates whether the display device is running or suspended, and the mode setting unit sets the electric-power supplying mode to the standby mode when the operation-state information indicates that the display device is suspended.

6. An image reproducing device as recited in claim 1, wherein the mode setting unit sets the electric-power supplying mode to the standby mode, when the point is lower than a predetermined second level which is lower than the predetermined first level, and the operation-state information indicates that the display is suspended.

7. An image reproducing system including an image reproducing device and a display device, wherein:
   the image reproducing device comprises
   a reproducing drive unit for reproducing an image signal recorded on a recording medium,
   a broadcast receiving unit for receiving a broadcast signal,
   an operation-state-information acquisition unit for obtaining operation-state information of the display device;
   an operation input unit for inputting an operation command to operate the image reproducing device;
   an operation-time-information acquisition unit for obtaining information on an operation time during which the reproducing drive unit and the broadcast receiving unit have been operated in accordance with the operation command;
   a point giving unit for giving a point for each of predetermined time slots according to the operation-time information;
   a storage unit for storing the point given for each of the predetermined time slots and an operation state in each of the predetermined time slots as operation-history information, the operation state representing a reproducing state in which the reproducing drive unit is operated or a viewing state in which the broadcast receiving unit is operated; and
   a mode setting unit for setting an electric-power supplying mode to the image reproducing device according to the operation-history information and the operation-state information, the electric-power supplying mode including a normal mode for supplying electric power to all of a plurality of devices including the reproducing drive unit and the broadcast receiving unit, a standby mode for supplying electric power to a device that enables the operation input unit to operate, and an energy saving mode for supplying electric power to a device that enables the operation input unit to operate and one unit selected from the reproducing drive unit and the broadcast receiving unit; and
   the display device displays the reproduced image signal.

8. An image recording/reproducing device comprising:
   a recording/reproducing drive unit for recording an image signal on a recording medium and reproducing the image signal recorded on the recording medium;
   a broadcast receiving unit for receiving a broadcast signal;
   an operation-state-information acquisition unit for obtaining operation-state information of a display device for displaying the reproduced image signal;
   an operation input unit for inputting an operation command to operate the image recording/reproducing device;
   an operation-time-information acquisition unit for obtaining information on an operation time during which the recording/reproducing drive unit and the broadcast receiving unit have been operated in accordance with the operation command;
   a point giving unit for giving a point for each of predetermined time slots according to the operation-time information;
   a storage unit for storing the point given for each of the predetermined time slots and a operation state in each of the predetermined time slots as operation-history information, the operation state representing a recording/reproducing state in which the recording/reproducing drive unit is operated or a viewing state in which the broadcast receiving unit is operated; and
   a mode setting unit for setting an electric-power supplying mode to the image reproducing device according to the operation-history information and the operation-state information, the electric-power supplying mode including a normal mode for supplying electric power to all of a plurality of devices including the recording/reproducing drive unit and the broadcast receiving unit, a standby mode for supplying electric power to a device that enables the operation input unit to operate, and an energy saving mode for supplying electric power to a device that enables the operation input unit to operate and one unit selected from the recording/reproducing drive unit and the broadcast receiving unit.

9. An image recording/reproducing device as recited in claim 8, wherein:
   the operation-state information indicates whether the display device is running or suspended;

the operation-tune information includes an operation start time and an operation end time, of the image recording/reproducing device;

the point given by the point giving unit for each of the predetermined time slots can be obtained by calculating usage probability of the image recording/reproducing device for each of the time slots from the operation start time and the operation end time; and the mode setting unit sets the electric-power supplying mode to the energy saving mode, when the point higher than a predetermined first level and the operation-state information indicates that the display device is running.

10. An image recording/reproducing device as recited in claim 8, wherein, the point giving unit gives a point different from the point obtained by calculating the usage probability of the image recording/reproducing device, instead of the point obtained by calculating the usage probability of the image recording/reproducing device, when an operation command instructs is to record the received image signal at a predetermined time.

11. A method for supplying electric power to an image reproducing device which includes a reproducing drive unit for reproducing an image signal recorded on a recording medium and a broadcast receiving unit for receiving a broadcast signal comprising:

an operation-state-information acquisition step of obtaining operation-state information of a display device for displaying the reproduced image signal;

an operation input step for receiving an input of an operation command to operate the image reproducing device; and an operation-time-information acquisition step for obtaining information on an operation time during which the reproducing drive unit and the broadcast receiving unit have been operated in accordance with the operation command;

a point giving step for giving a point for each of predetermined time slots according to the operation-time information;

a storing step for the point given for each of the predetermined time slots and a operation state in each of the predetermined time slots as operation-history information, the operation state representing a reproducing state in which the reproducing drive unit is operated or a viewing state in which the broadcast receiving unit is operated; and a mode setting step for setting a electric-power supplying mode to the image reproducing device according to the operation-history information and the operation-state information, the electric-power supplying mode including a normal mode for supplying electric power to all of a plurality of devices including the reproducing drive unit and the broadcast receiving unit, a standby mode for supplying electric power to a device that enables the operation input unit to operate, and an energy saving mode for supplying electric power to a device that enables the operation input unit to operate and one unit selected from the reproducing drive unit and the broadcast receiving unit.

12. A method for supplying electric power to an image recording/reproducing device which includes a recording/reproducing drive unit for recording an image signal on a recording medium and reproducing the image signal recorded on the recording medium and a broadcast receiving unit for receiving a broadcast signal comprising:

an operation-state-information acquisition step of obtaining operation-state information of a display device for displaying the reproduced image signal;

an operation input step for receiving an input of an operation command to operate the image recording/reproducing device;

an operation-time-information acquisition step of obtaining information on an operation time during which the recording/reproducing drive unit and the broadcast receiving unit have been operated in accordance with the operation command;

a point giving step for giving, on the basis of the operation-time information, a point for each of predetermined time slots;

a storing step for storing the point given for each of the predetermined time slots and a operation state in each of the predetermined time slots as operation-history information, the operation state representing a recording/reproducing state in which the recording/reproducing drive unit is operated or a viewing state in which the broadcast receiving unit is operated; and a mode setting step for setting an electric-power supplying mode to the image recording/reproducing device according to the operation-history information and the operation-state information, the electric-power supplying mode including a normal mode for supplying electric power to all of a plurality of devices including the recording/reproducing drive unit and the broadcast receiving unit, a standby mode for supplying electric power to a device that enables the operation input unit to operate, and an energy saving mode for supplying electric power to a device that enables the operation input unit to operate and one unit selected from the recording/reproducing drive unit and the broadcast receiving unit.

* * * * *